US011029210B2

(12) United States Patent
Schlegel et al.

(10) Patent No.: US 11,029,210 B2
(45) Date of Patent: Jun. 8, 2021

(54) PROCESS FOR THE APPROACH TO AN ORIENTED RELATIVE POSITION BETWEEN A CAMERA OR SCANNING DEVICE AND A DENTAL ASSISTANCE ELEMENT (71) Applicant: Ivoclar Vivadent AG, Schaan (LI)

(72) Inventors: Manuel Schlegel, Schaan (LI); Markus Pauler, Feldkirch (AT)

(73) Assignee: Ivoclar Vivadent AG, Schaan (LI)

( * ) Notice: Subject to any disclaimer, the term of this patent is extended or adjusted under 35 U.S.C. 154(b) by 42 days.

(21) Appl. No.: 16/469,986

(22) PCT Filed: Dec. 22, 2017

(86) PCT No.: PCT/EP2017/084381
§ 371 (c)(1),
(2) Date: Jun. 14, 2019

(87) PCT Pub. No.: WO2018/115437
PCT Pub. Date: Jun. 28, 2018

(65) Prior Publication Data
US 2020/0088582 A1 Mar. 19, 2020

(30) Foreign Application Priority Data
Dec. 22, 2016 (EP) .................................... 16206420

(51) Int. Cl.
*G06T 7/73* (2017.01)
*G01J 3/50* (2006.01)
*H04N 5/232* (2006.01)
(52) U.S. Cl.
CPC ................ *G01J 3/508* (2013.01); *G06T 7/74* (2017.01); *H04N 5/232939* (2018.08);
(Continued)

(58) Field of Classification Search
CPC .............. G01J 3/508; H04N 5/232945; H04N 5/232939; H04N 5/23293; G06T 7/74;
(Continued)

(56) References Cited

U.S. PATENT DOCUMENTS

2007/0081631 A1* 4/2007 Kay ........................ G06T 11/60
378/168
2008/0145812 A1* 6/2008 Taub ...................... A61C 7/146
433/3
2010/0304323 A1 12/2010 Rohner et al.

FOREIGN PATENT DOCUMENTS

KR 101315862 B1 10/2013
WO 2012038474 A1 3/2012

* cited by examiner

*Primary Examiner* — Chuong A Ngo
(74) *Attorney, Agent, or Firm* — Ann M. Knab; Thad McMurray (57) ABSTRACT The invention concerns a process for the approach to an oriented relative position between a camera or scanning device and a dental assistance element (10), in particular via an app on a smartphone, for recording the dental assistance element (10), such as a miniature shade guide (10). A mark (4) is attached to the dental assistance element (10), and/or at least one part of the dental assistance element (10) is used as a mark (4). A stencil (6) which is congruent with or mathematically similar to the mark (4) is displayed on a display device of the camera or scanning device. For the approach to the oriented relative position between the camera or scanning device and the dental assistance element, a modification of the degree of coverage of the stencil (6) with the mark (4) or the one part of the dental assistance element (10) is detected.

17 Claims, 4 Drawing Sheets (52) U.S. Cl.
CPC ............... *H04N 5/232945* (2018.08); *G06T 2207/10024* (2013.01); *G06T 2207/30036* (2013.01); *G06T 2207/30204* (2013.01); *G06T 2207/30244* (2013.01)

(58) Field of Classification Search
CPC . G06T 2207/10024; G06T 2207/30036; G06T 2207/30204; G06T 2207/30244; A61C 19/10; A61C 9/0053
See application file for complete search history.

PROCESS FOR THE APPROACH TO AN ORIENTED RELATIVE POSITION BETWEEN A CAMERA OR SCANNING DEVICE AND A DENTAL ASSISTANCE ELEMENT

CROSS-REFERENCE TO RELATED APPLICATIONS

This application is a National Stage application of International patent application No. PCT/EP2017/084381 filed on Dec. 22, 2017, which claims priority to European patent application No. 16206420.8 filed on Dec. 22, 2016, all the disclosures of which are incorporated herein by reference in their entirety.

FIELD OF THE INVENTION

The invention concerns a process for the approach to an oriented relative position between a camera or scanning device and a dental assistance element for recording the dental assistance element.

BACKGROUND OF THE INVENTION

For producing a prosthetic tooth, it is important, among other things, to achieve as small as possible a color difference between the prosthetic tooth and the neighbouring natural tooth, or the neighbouring natural teeth, respectively, in order to be able to give the restoration part a natural appearance.

The invention concerns a process for the approach to an oriented relative position between a camera or scanning device and a dental assistance element for recording the dental assistance element in accordance with the preamble of claim 1 or 2, respectively.

For producing a prosthetic tooth, it is important, among other things, to achieve as small as possible a color difference between the prosthetic tooth and the neighbouring natural tooth, or the neighbouring natural teeth, respectively, in order to be able to give the restoration part a natural appearance.

For this purpose, the first step is to find out the color of the natural tooth concerned. It has been suggested to determine the tooth color with the help of a reference by means of comparison.

Such references include shade guides which serve as auxiliaries in selecting the tooth color. Such a shade guide is known from the publication EP 2 255 749 B1. The (miniature) shade guide there is provided with a multitude of color patterns which are arranged in the fashion of a matrix. Each color pattern corresponds to a tooth color common in the market, and preferably, tooth colors which are similar to each other are arranged adjacent to each other. The shade guide there is attached to a tooth, which is, to its vestibular surface. By means of an optical comparison, one can manage to detect the identity of a color pattern with a surface of a neighbouring tooth, such that for this surface the tooth color has been determined and therefore detected.

A correct determination of a tooth color, however, is difficult because the tooth color cannot be characterized with the help of the color alone. The translucency and lightness of the natural tooth, which are, among other things, subject to the tooth structure, also play a great role in determining the tooth color.

It has further been suggested to take photos of the tooth with the help of a camera. With the help of the photos, an image analysis is carried out, whose result is determined as the measured color of at least a portion of the tooth.

Furthermore, the tooth behaves metamerically, and the appearance of the tooth changes depending on the given light situation and viewing angle—both for human eyes and for a photo taken of the tooth and/or of the shade guide. These external factors make the determination of the tooth color more difficult, too.

SUMMARY OF THE INVENTION

Therefore, the invention is based on the task of creating a process according to the claims, with the help of which at least a simple and precise selection of color is possible.

This task is solved, in accordance with the invention, by the claims. Advantageous further embodiments result from the subordinate claims.

In accordance with the invention, a relative position is aligned between a camera or scanning device and a dental assistance element in order to record a dental assistance element, such as a miniature shade guide, if necessary together with a tooth to be compared. After the alignment, the position of the camera remains unchanged, e.g. with the help of some intelligent software in combination with an image processing device. A constantly unchanged position of the camera or the recording situation means more specifically that the distance of the camera or scanning device from the dental assistance element, the alignment of the camera or scanning device relative to the dental assistance element, and the viewing angle must be kept steady.

In a preferred embodiment, at least one asymmetry in the form of a mark or stencil should be employed both in the dental assistance element and in the camera or scanning device. During the alignment, the asymmetry at the dental assistance element is brought to coverage with the asymmetry at the camera or scanning device. In case of complete coverage, the alignment is accomplished, in accordance with the invention.

As a result, in accordance with the invention, all external factors mentioned before, e.g. the light situation or influences to the recording for determining the color, can be kept steady.

In another preferred embodiment, a mark with at least one asymmetry should be attached on the dental assistance element. A stencil which is congruent with or mathematically similar to the mark is displayed on a display device of the camera or scanning device. In order to align the camera or scanning device, the stencil is subsequently brought to coverage with the mark.

In order to determine whether the stencil is in complete coverage with the mark, one may monitor with the naked eye through the camera or via the scanning device whether merely the cut-out portion of the stencil, but not the areas outside the cut-out portion of the stencil as well, is filled by the mark.

In accordance with the invention, it is favourable that during the alignment there is a color difference between the portion of the mark within the cut-out portion of the stencil and the portion of the mark outside the cut-out portion of the stencil due to the stencil displayed on the display device of the camera or scanning device. The portion of the mark within the cut-out portion of the stencil has a rather natural color, whereas the portion of the mark outside the cut-out portion of the stencil has an opaque color. Therefore, it is visible for the observer whether the stencil is already in complete coverage with the mark or not during the alignment.

In another preferred embodiment, additionally to a mark with at least one asymmetry being attached on the dental assistance element, at least one part of the dental assistance element, or merely that alone, should be used with an asymmetry as a mark. For the alignment of the camera or scanning device, the stencil is subsequently brought to coverage with the part of the dental assistance element.

If the dental assistance element is provided in the form of a (miniature) shade guide which is provided with a multitude of color patterns which are each arranged cubically and in the fashion of a matrix, a part of these color patterns with an asymmetrical arrangement may be used as the mark.

In another preferred embodiment, inside the camera or inside the scanning device or inside a memory for the camera or inside a memory for the scanning device, a stencil which is congruent with or mathematically similar to the mark or at least one part of the dental assistance element should be stored as a virtual image. For aligning the camera or scanning device, the stencil is brought to coverage with the mark or the one part of the dental assistance element.

In the memory for the camera or scanning device, a multitude of such virtual images may be stored, which show virtual stencils in different shapes, each corresponding to one mark.

It is favourable that with the help of the virtual stencils, the production of real stencils is avoided and the storage and the management of stencils is also simplified.

In accordance with the invention, it is even more favourable that with the help of the camera or scanning device, a not yet successful alignment or coverage, respectively, of the virtual stencil with the mark may be recognised, and then an approach to coverage is signalled for the operator.

The automatic recognition process by means of the camera or scanning device may work similar to that with the help of the operator's naked eye. However, this may also work based on another basically known fashion. It is advantageous that the precision of the automatic recognition of coverage may be distinctly higher than that in human observation.

It is particularly favourable to signal an approach to coverage with the help of the camera or scanning device. Hereby, the operator is instructed to adjust the distance between the dental assistance element and the camera/scanning device and/or the position of the camera/scanning device and/or the orientation of the camera/scanning device and/or the angle of the camera/scanning device relative to the dental assistance element.

In another preferred embodiment, characterising features of the mark or at least one part of the dental assistance element, in particular concerning the distances of points from each other and/or the angles between lines and/or the positions of points and lines and/or the color values of points, should be stored inside the camera or inside the scanning device or inside a memory for the camera or inside a memory for the scanning device.

For the approach to the aligned relative position between the camera or scanning device and the dental assistance element, the features of the mark or the one part of the dental assistance element will be searched based on the features stored. In particular, an identification of at least one of the features is detected and signalled during the search.

For example, the mark consists of four round points with equal diameter, which points are arranged in the four corners of a square. In this case, information is stored about this: Four round points with equal diameter, and the distances between the four points have the ratio of 1:1:root(2) to each other.

In an image processing step, round points with identical diameter are then searched. The points found will subsequently be examined for the further information until all four points have been identified.

It is favourable that the production of real stencils is also avoided with the help of the stored features.

Furthermore, this embodiment offers the possibility of easily modifying or updating, respectively, features of marks or parts of the dental assistance element inside the camera or scanning device, respectively.

In another preferred embodiment, assistance elements, such as arrows, should be displayed on an optical surface of the camera or scanning device if coverage has not yet been achieved. The assistance elements may point into the direction in which coverage may be achieved.

For example, an arrow displayed on the optical surface of the camera or scanning device and pointing towards the right means that the camera/scanning device should be moved towards the right. Four arrows which point upwards, downwards, right, and left, respectively, mean that the distance between the tooth and the camera/scanning device should be increased. A curved arrow or two curved arrows opposite of each other mean that the orientation of the camera/scanning device towards the tooth or towards the dental assistance element, respectively, should be regulated accordingly. An arrow pointing towards the right into a black point means that the right part of the camera/scanning device should be rotated around an axis parallel to the mark of the dental assistance element in the direction towards this, so that the recording angle required between the camera/scanning device and the dental assistance element amounts to, e.g., precisely 90°.

In another preferred embodiment, the stencil should be displayed on an optical surface of the camera or scanning device. For this purpose, the stencil may be connected adjacently to the housing of the camera lens in a basically known fashion, such that the stencil, in particular the cut-out portion of the stencil, is positioned centrally on the camera lens and in coverage with the latter.

In another preferred embodiment, the physically present stencil should be displayed on a virtual image and be detected by an image recognition device. This image may be stored in a memory for the camera or scanning device in advance. During the alignment process, the image is retrieved from the memory, and is displayed on a display device of the camera or scanning device. Subsequently, a virtual stencil is displayed within the image, and is then detected by an image recognition device. This image, including the stencil displayed, is used for alignment.

In another preferred embodiment, the displaying of the stencil should be detected, and alignment advice for the camera or scanning device should be output depending on the position of the stencil displayed. In particular after the stencil has been displayed within the virtual image, alignment advice for the camera or scanning device is activated. Accordingly, the position of the stencil displayed is detected and is used as the starting point for the alignment. The alignment advice in the form of, e.g., arrows, is generated automatically, based on this position and the position of the tooth or the dental assistance element, respectively, and is then displayed.

In another preferred embodiment, the alignment advice should concern the focussing or the electronically controllable detection range of the camera, and the detection of the image should be modified based on this, if necessary. The focussing advice is generated based on the current distance between the tooth and the camera/scanning device, and based on the current position of the camera/scanning device and the orientation of the camera/scanning device and the angle of the camera/scanning device in relation to the dental assistance element, some advice is given on a possible modification of the electronically controllable detection range of the camera.

In another preferred embodiment, the alignment advice should be provided as optical and/or acoustic and/or mechanical advice for the user of the camera. Optical alignment advice may, e.g., be the arrows mentioned above or other symbols which are suitable for clearly instructing the user on the applicable alignment of the camera or scanning device.

Acoustic advice is given, e.g., in the form of voice output, such as—"Camera is now distorted!" or "Wrong distance!"—with the help of which corresponding indications may be communicated to the user.

In another preferred embodiment, the coincidence or coverage between the stencil and the mark or a part of the dental assistance element is signalled by means of an optical, acoustic, or mechanical display, or by means of triggering the camera.

In case of an applicable, complete coverage of the stencil by the mark, on the display device of the camera or scanning device, for instance, the following output may be displayed: "Alignment given!". Alternatively or additionally, the user may be informed in an acoustic way, which is different from the acoustic display during the alignment phase, about the given alignment of the camera.

In another preferred embodiment, the mark or the one part of the dental assistance element should be provided with points arranged in a line or with lines for the detection of an angular error.

It is particularly favourable that with a shade guide made up of cubical color patterns or a ceramic grid, respectively, the color patterns are separated from each other by means of a defined distance of the columns. Within the column, points arranged in a line or lines may be provided.

These points or lines are only visible through the camera during the alignment if the camera is positioned orthogonally relative to the shade guide or the tooth, respectively, i.e. if the predetermined, optimal recording angle has been achieved.

At the stencil, such points or lines may also be provided. Whether or not the points or lines at the shade guide coincide with the corresponding line of points or the mark of the stencil, is detectable via the camera or scanning device for determining an angular error.

BRIEF DESCRIPTION OF THE DRAWINGS

Further advantages, details and features result from the subsequent description of exemplary embodiments of the invention with the help of the drawings, which show:

FIG. 3b another schematically depicted state of the mark and the stencil during the execution of the embodiment of the process in accordance with the invention according to FIG. 3a;

FIG. 3c another schematically depicted state of the mark and the stencil during the execution of the embodiment of the process in accordance with the invention according to FIG. 3a;

FIG. 3d another schematically depicted state of the mark and the stencil during the execution of the embodiment of the process in accordance with the invention according to FIG. 3a;

FIG. 4b another schematically depicted state of the mark and the stencil during the execution of the embodiment of the process accordance with the invention according to FIG. 4a;

FIG. 4c another schematically depicted state of the mark and the stencil during the execution of the embodiment of the process accordance with the invention according to FIG. 4a;

DETAILED DESCRIPTION

Figure 1:
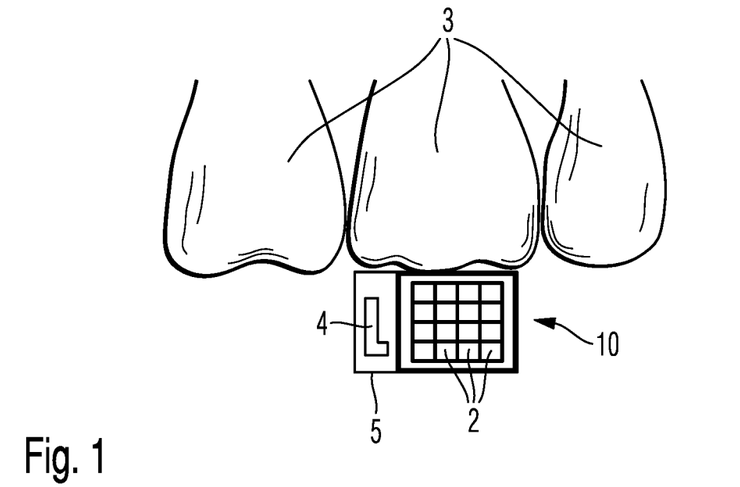
FIG. 1 a schematically depicted arrangement with an embodiment of the miniature shade guide used in the process in accordance with the invention, and with three incisors in a front view.

The embodiment of the miniature shade guide 10 used in the process in accordance with the invention that is depicted in FIG. 1 is arranged to be attached in a basically known fashion to one of the incisors 3 depicted. For the comparison of the colors of miniature shade guide 10 with the color of incisors 3, in particular of the centrally placed incisor 3, for the purpose of color determination, at least one photo is taken with the help of a camera or scanning device.

The embodiment of the miniature shade guide 10 used in the process in accordance with the invention that is depicted in FIG. 1 is arranged to be attached in a basically known fashion to one of the incisors 3 depicted. For the comparison of the colors of miniature shade guide 10 with the color of incisors 3, in particular of the centrally placed incisor 3, for the purpose of color determination, at least one photo is taken with the help of a camera or scanning device.

The miniature shade guide 10 depicted according to FIG. 1 is provided with sixteen color patterns 2 which are arranged in the fashion of a four-times-four matrix. Adjacently to the matrix, an L-shaped mark 4 is positioned on a substrate 5. For the purpose of aligning the camera or scanning device, a stencil 6 of the camera or scanning device is brought to coverage with mark 4.

Figure 2:
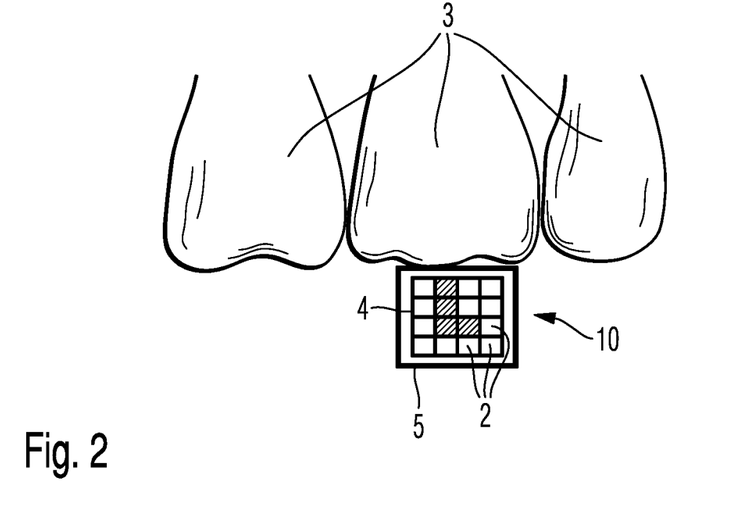
FIG. 2 a schematically depicted arrangement with another embodiment of the miniature shade guide used in the process in accordance with the invention, and with three incisors in a front view.

The embodiment of the miniature shade guide 10 used in the process in accordance with the invention which is depicted in FIG. 2 differs from the embodiment which is depicted in FIG. 1 in that the substrate 5 and the mark 4 positioned on top of it are no longer necessary in accordance with the invention, but rather a portion of the matrix—corresponding to the portion which is designated by diagonal lines according to FIG. 2—itself forms an L-shaped mark. For the purpose of aligning the camera or scanning device, the stencil is subsequently brought to coverage with this portion of color pattern 2.

In accordance with each of FIGS. 3a to 4c, a state of mark 4 and stencil 6 during the alignment of the camera or scanning device is shown within the detection range 7 of the camera or scanning device. With relation to miniature shade guide 10, merely its mark 4 is depicted. The (other) color patterns 2 and the possible substrate 5 of miniature shade guide 10 are not depicted.

In the embodiment of the process in accordance with the invention depicted according to FIGS. 3a to 3d, an L-shaped stencil 6 is used which is congruent with mark 4 and is displayed on a display device of the camera or scanning device.

Figure 3A:
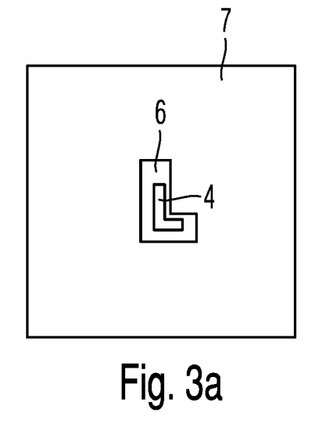
FIG. 3a a schematically depicted state of the mark and the stencil during the execution of one embodiment of the process in accordance with the invention.

It is apparent from FIG. 3a that within the detection range 7 of the camera or scanning device, mark 4 is distinctly smaller than stencil 6 and is displayed within the cut-out portions of the latter.

This means that the distance between the camera or scanning device and miniature shade guide 10 is distinctly larger than the nominal distance. The operator of the camera or scanning device should then approach the camera or scanning device to miniature shade guide 10 correspondingly.

Figure 3B:
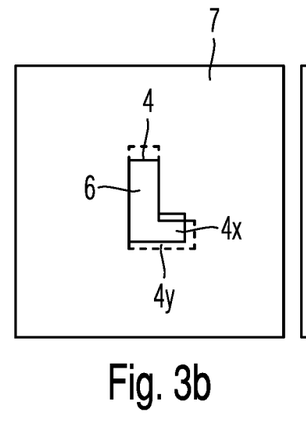

In accordance with FIG. 3b, mark 4 is shown to be a bit larger than stencil 6 within the detection range 7 of the camera or scanning device. This means that the distance between the camera or scanning device and miniature shade guide 10 is a bit too small. In accordance with FIG. 3b, mark 4 is provided with a portion 4x which is visible within the cut-out portion of stencil 6 and a portion 4y not clearly visible due to the non-transparent material of stencil 6 outside of the cut-out portion of stencil 6. The visible portion 4x of mark 4 has a rather natural color, whereas the not clearly visible portion 4y of mark 4 has an opaque color.

In accordance with the invention, the difference in colors between the natural color and the opaque color is made use of. It is particularly advantageous for the user of the camera or scanning device to determine, in case of a scarce coverage, as a result of this difference in colors, that stencil 6 is not yet in complete coverage with mark 4.

Figure 3C:
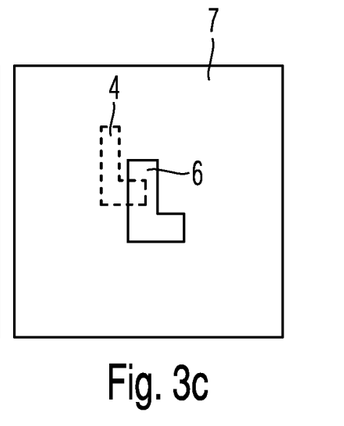

It is apparent from FIG. 3c that the relative position of the camera or scanning device towards miniature shade guide 10 is not optimal. The operator of the camera or scanning device should then adjust the position of the camera or scanning device to miniature shade guide 10 correspondingly.

Figure 3D:
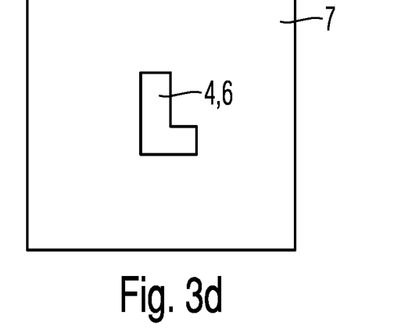

FIG. 3d shows a successful coverage of stencil 6 with mark 4.

Figure 4A:
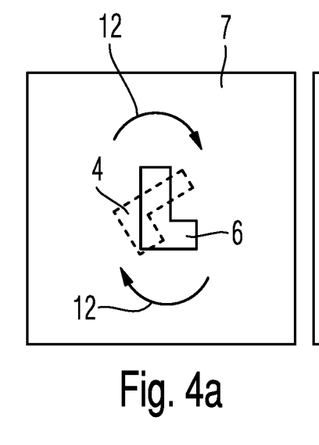
FIG. 4a a schematically depicted state of the mark and the stencil during the execution of another embodiment of the process accordance with the invention.
Figure 4B:
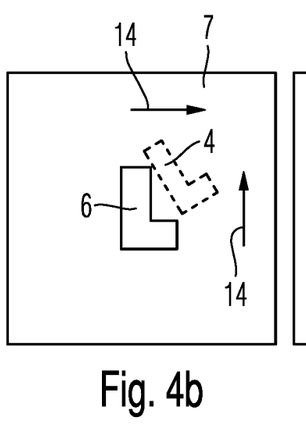
Figure 4C:
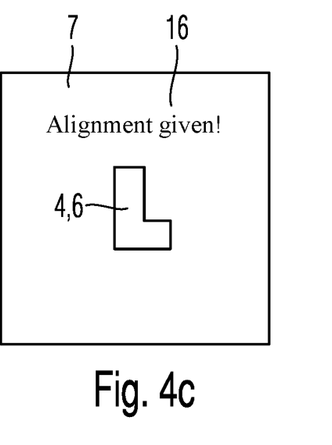

In the embodiment of the process in accordance with the invention which is depicted according to FIGS. 4a to 4c, an L-shaped stencil 6 is used which is congruent with mark 4 and is stored as a virtual image in the camera or scanning device. On an optical surface of the camera or scanning device, arrows 12, 14 and written information 16 are displayed as assistance elements which serve for the purpose of signalling an approach to coverage and/or successful coverage.

It is apparent from FIG. 4a that stencil 6 is twisted relative to mark 4, i.e. the camera or scanning device is twisted in relation to miniature shade guide 10. This is detected by the camera or scanning device in real time in a basically known fashion. Accordingly, some advice is displayed on the display device of the camera or scanning device in accordance with the invention, which advice is displayed in the form of two arrows 12 situated opposite of each other and curved inwards, and recommending to rotate the camera or scanning device.

In accordance with FIG. 4b, the camera or scanning device is not only twisted relative to miniature shade guide 10, but also has a wrong distance from miniature shade guide 10 and is in a wrong position.

In accordance with the invention, the camera or scanning device determines in this situation that first the position of the camera or scanning device is to be adjusted. Accordingly, on the display device of the camera or scanning device some advice is displayed in the form of an arrow 14 pointing upwards and an arrow 14 pointing towards the right to move the camera or scanning device in an upward right direction.

In accordance with the invention, a successful coverage of stencil 6 with mark 4 is detected by the camera or scanning device, and is at the same time automatically indicated on the display device with the help of the written indications 16 "Alignment given!" (cf. FIG. 4c).

The automatic detection of coverage by the camera or scanning device in accordance with FIGS. 4a to 4c has a significantly higher precision in accordance with the invention, compared with human observation.

Figure 5:
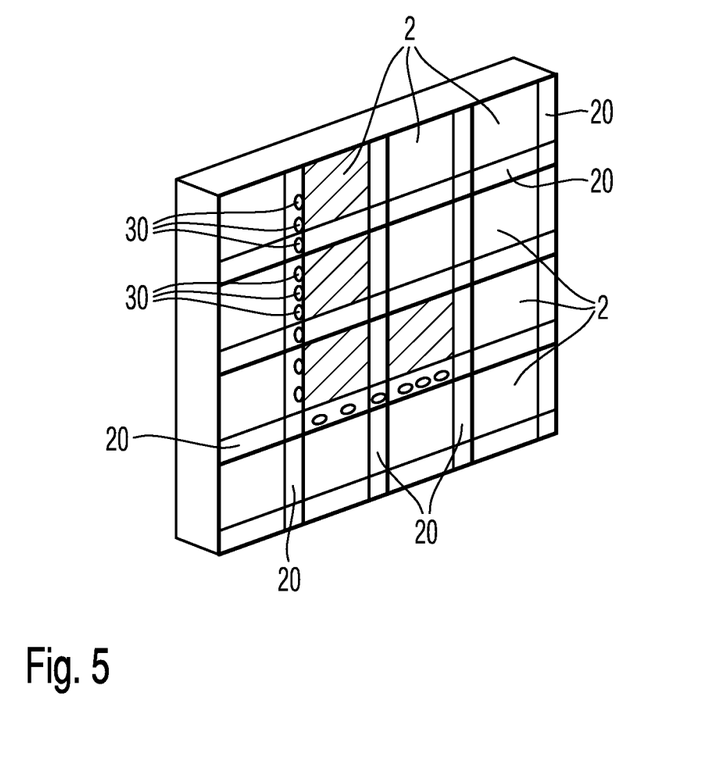
FIG. 5 another schematically depicted embodiment of the miniature shade guide used in the process in accordance with the invention.

In the embodiment of miniature shade guide 10 which is depicted according to FIG. 5, color patterns 2 are separated from each other by a defined distance of columns 20. Color patterns 2, which are designated by diagonal lines, form the mark 4 for the alignment.

In accordance with the invention, a multitude of points 30 are arranged in the columns 20 adjacent to these color patterns 2, which points may preferably also be colored. These points 30 are only visible in the alignment process through the camera if the camera is oriented orthogonally towards shade guide 10. Only then, the pre-defined optimal recording angle has been reached.

In an embodiment of miniature shade guide 10 which is not depicted, mark 4 should have, e.g., the color green and merely look green in a precise front view, whereas with other viewing angles it appears in different colors. This guarantees a correct viewing angle for the recording, in accordance with the invention.

In another embodiment of miniature shade guide 10 which is not depicted, for the examination of the required orthogonality between the camera or scanning device and miniature shade guide 10, the outside contour of miniature shade guide 10 is taken account of and made use of. For this purpose, for example, a pre-defined outside contour of miniature shade guide 10 corresponding to the orthogonal orientation of the camera and miniature shade guide 10 is stored in the camera or scanning device in advance. During the alignment, this pre-defined outside contour is compared with the outside contour of miniature shade guide 10 which is detected by the camera or scanning device. If they coincide, a required orthogonality between the camera or scanning device and miniature shade guide 10 is confirmed.

In another embodiment of miniature shade guide 10 which is not depicted, more than one mark with different colors are used. A color differentiation will guarantee, in accordance with the invention, the correct orientation of the camera or scanning device relative to miniature shade guide 10.

Figure 6:
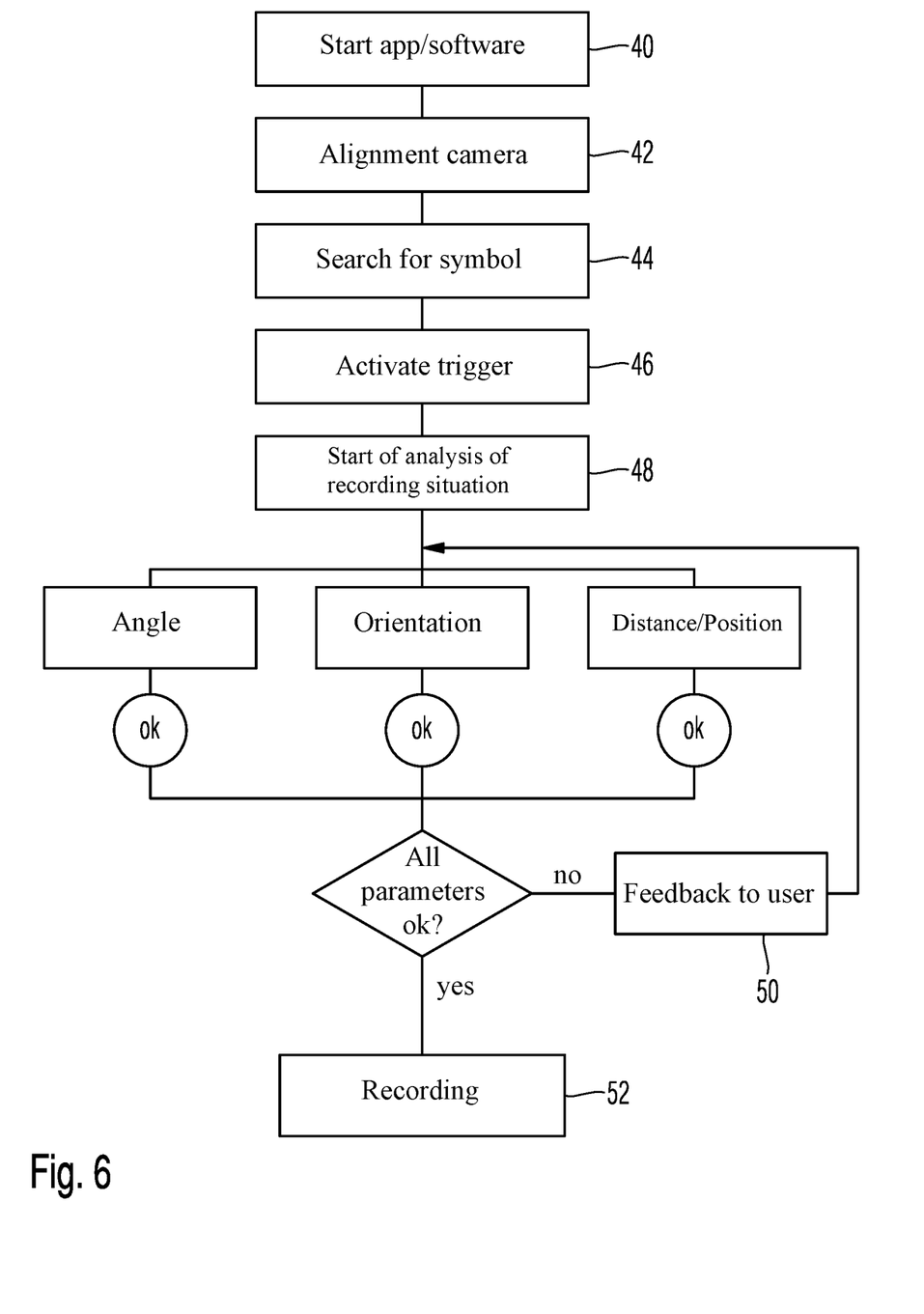
FIG. 6 a block diagram for the sequence of an embodiment of the process in accordance with the invention.

For the execution of the process in accordance with the invention which is depicted in FIG. 6, a smartphone that is commonly available in the market may be used together with a corresponding app, for example. For the alignment of the camera of the smartphone, the app is first started (cf. step 40). Subsequently, the app instructs the user to carry out the alignment (cf. step 42) in that the user searches a symbol or a stencil 6 shown on the display of the smartphone by approaching the camera towards miniature shade guide 10 (cf. step 44). Finding the symbol is confirmed (cf. step 46) and leads to an analysis of the recording situation (cf. step 48). If the parameters necessary for the recording, such as the recording angle, the orientation of the camera, the distance and position of the camera relative to the symbol, are not fulfilled, the app will inform the user about this and instruct him to calibrate the camera (cf. step 50). If all these parameters are fulfilled, a photo of miniature shade guide 10 and the teeth 3 to be compared is taken (cf. step 52).

The invention claimed is:

1. Process for an approach to an oriented relative position between a camera or scanning device and a dental assistance element (10) for recording the dental assistance element (10) comprising
    wherein the dental assistance element (10) comprises a miniature shade guide,
    wherein there is a mark (4) attached to the dental assistance element (10), and/or
    wherein at least one part of the dental assistance element (10) is used as a mark (4),
    wherein a stencil (6) which is congruent with or mathematically similar to the mark (4) is displayed on a display device of the camera or scanning device, and
    wherein for the approach to the oriented relative position between the camera or scanning device and the dental assistance element, a modification of a degree of coverage of the stencil (6) with the mark (4) or the at least one part of the dental assistance element (10) is detected.

2. Process according to claim 1,
    wherein the mark (4) is provided with at least one asymmetry.

3. Process according to claim 1,
    wherein for the approach to the oriented relative position between the camera or scanning device and the dental assistance element, the stencil (6) is brought to coverage or is brought substantially to coverage with the mark (4) or the at least one part of the dental assistance element (10), or the mark (4) or at least one part of the dental assistance element (10) and the stencil (6) are aligned with each other.

4. Process according to claim 3,
    wherein the congruence or coverage between the stencil (6) and the mark (4) or the at least one part of the dental assistance element (10) is signalled by an optical, acoustic, or mechanic display (16), or by triggering the camera.

5. Process according to claim 1,
    wherein assistance notifiers are displayed on an optical surface (7) of the camera or scanning device when coverage has not yet been reached,
    wherein the assistance notifiers point into the direction in which the coverage may be reached by a relative movement between the dental assistance element (10), or a patient with the dental assistance element (10), and the camera or scanning device.

6. Process according to claim 5,
    wherein the assistance notifiers comprise arrows (12, 14).

7. Process according to claim 1,
    wherein the stencil (6) is displayed on an optical surface (7) of the camera or scanning device.

8. Process according to claim 1,
    wherein the stencil (6) is physically present and is displayed on a virtual image and is detected by an image recognition device and is converted into data, and
    wherein based on the data for the approach to the oriented relative position between the camera or scanning device and the dental assistance element, a modification of the degree of coverage of the stencil (6) with the mark (4) or the at least one part of the dental assistance element (10) is detected and/or the degree of coverage and/or the modification of the degree of coverage is signalled.

9. Process according to claim 8,
    wherein alignment advice (12, 14, 16) is output for the camera or scanning device depending on the position of the stencil (6) relative to the image detected.

10. Process according to claim 9,
    wherein the alignment advice (12, 14) concerns focusing or an electronically controllable detection range (7) of the camera, and based on the alignment advice, the detection of the image is modified, if necessary.

11. Process according to claim 9,
    wherein the alignment advice (12, 14, 16) is provided as optical and/or acoustic and/or mechanic advice.

12. Process according to claim 11,
    wherein the optical and/or acoustic and/or mechanic advice comprises vibrations and/or pulses for a user of the camera or scanning device.

13. Process according to claim 1,
    wherein the mark (4) or the at least one part of the dental assistance element (10) is provided for detection of an angular error, with points (30) arranged in a line, or with lines having congruence with corresponding line of points or mark of the stencil (6) in order to determine an angular error.

14. Process according to claim 1,
    wherein the process occurs on an application (app) on a smartphone.

15. Process for an approach to an oriented relative position between a camera or scanning device and a dental assistance element (10), for recording the dental assistance element (10) comprising
    wherein the dental assistance element (10) comprises a miniature shade guide,
    wherein there is a mark (4) attached to the dental assistance element (10), and/or wherein at least one part of the dental assistance element (10) is used as a mark (4),
    wherein inside the camera or inside the scanning device or inside a memory for the camera or inside a memory for the scanning device, a stencil (6) which is congruent with or mathematically similar to the mark (4) or to the at least one part of the dental assistance element (10) is or are stored as a virtual image or characterising features of the mark (4) or at least one part of the dental assistance element (10) is stored, with relation to the distances of points from the stencil (6) and the mark (4) or the at least one part of the dental assistance element and/or an angle between lines and/or the positions of points and lines and/or the color values of points, and
    wherein for the approach to the oriented relative position between the camera or scanning device and the dental assistance element, a modification of the degree of coverage of the stencil (6) with the mark (4) or the at least one part of the dental assistance element (10) is detected and/or the degree of coverage and/or the modification of the degree of coverage is signalled, or wherein the approach to the oriented relative position between the camera or scanning device and the dental assistance element based on the stored features, the features of the mark (4) or the at least one part of the dental assistance element (10) are searched, wherein during the search, an identification of at least one of the features is detected and signalled.

16. Process according to claim 2,
wherein for the approach to the oriented relative position between the camera or scanning device and the dental assistance element, the distance between the stencil (6) and the mark (4) or the at least one part of the dental assistance element (10) is displayed and/or the modification of this distance is signalled.

17. Process according to claim 15,
wherein the process occurs on an application (app) on a smartphone.

* * * * *